US012643540B2

(12) United States Patent　　　　(10) Patent No.:　US 12,643,540 B2
Talluri et al.　　　　　　　　　　　　(45) Date of Patent:　　Jun. 2, 2026

(54) VEHICLE CONTROL BASED ON PATHWAY PAVING STATUS AND LOCATION TELEMETRY

(71) Applicant: GM GLOBAL TECHNOLOGY OPERATIONS LLC, Detroit, MI (US)

(72) Inventors: Chandra Sekhar Talluri, Brighton, MI (US); Shu Chen, Rochester Hills, MI (US); Donald K. Grimm, Utica, MI (US); David A Craig, Owasso, OK (US); Darren Ghiso, Birmingham, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 74 days.

(21) Appl. No.: 18/894,455

(22) Filed: Sep. 24, 2024

(65) Prior Publication Data

US 2026/0084697 A1　　Mar. 26, 2026

(51) Int. Cl.
*B60W 60/00*　　　　(2020.01)
*B60W 30/12*　　　　(2020.01)

(52) U.S. Cl.
CPC ........ *B60W 30/12* (2013.01); *B60W 60/0025* (2020.02); *B60W 60/0053* (2020.02); *B60W 2756/10* (2020.02)

(58) Field of Classification Search
None
See application file for complete search history.

(56) References Cited

U.S. PATENT DOCUMENTS

| | | | | |
|---|---|---|---|---|
| 11,529,957 B2 * | 12/2022 | Clarke | ........... | B60W 30/18163 |
| 11,643,108 B1 * | 5/2023 | Dicle | ................ | B60W 60/0011 |
| | | | | 701/23 |
| 11,885,625 B1 * | 1/2024 | McGavran | ............. | G01C 21/32 |
| 2013/0345900 A1 * | 12/2013 | Usui | ..................... | B60W 10/20 |
| | | | | 701/1 |
| 2020/0151611 A1 * | 5/2020 | McGavran | .............. | H04W 4/44 |
| 2020/0307622 A1 * | 10/2020 | Pomish | ................. | B60W 50/16 |

(Continued)

FOREIGN PATENT DOCUMENTS

| | | |
|---|---|---|
| DE | 10030932 A1 | 1/2002 |
| DE | 10254806 A1 | 6/2004 |

(Continued)

*Primary Examiner* — James M Mcpherson
(74) *Attorney, Agent, or Firm* — Quinn IP Law

(57)　　　　　　ABSTRACT

A system for controlling the operation of a vehicle includes a controller and a command unit. The command unit is adapted to generate a respective paving status of a respective pathway based on aggregated vehicle trajectories of a plurality of vehicles traversing the respective pathway, including extracting respective coordinates and respective trajectories of the plurality of vehicles over a predefined time period. The command unit is adapted to determine respective lateral distances between the plurality of vehicles and a centerline in the respective pathway. The respective pathway is designated as an unpaved pathway when one or more predefined conditions based on the respective lateral distances are met. The unpaved pathway is defined by an absence of centerline markings. The controller is adapted to retrieve the respective paving status and control the operation of the vehicle when the vehicle is traversing the unpaved pathway.

20 Claims, 5 Drawing Sheets

(56) References Cited

U.S. PATENT DOCUMENTS

| | | | | |
|---|---|---|---|---|
| 2022/0009512 A1* | 1/2022 | Urano | .................. | B60W 40/09 |
| 2022/0348227 A1* | 11/2022 | Foster | .................. | B60Q 1/507 |
| 2023/0093282 A1* | 3/2023 | Bergen | ................. | G01S 13/751 |
| | | | | 701/26 |
| 2023/0174106 A1* | 6/2023 | Xiang | .................. | B60W 30/09 |
| | | | | 701/23 |
| 2023/0177795 A1* | 6/2023 | Klement | .................. | G06T 3/40 |
| | | | | 382/103 |
| 2023/0202511 A1* | 6/2023 | Atsmon | ................. | G06V 20/58 |
| | | | | 701/23 |
| 2023/0234583 A1* | 7/2023 | Cordeiro | ............ | B60W 50/023 |

FOREIGN PATENT DOCUMENTS

| | | |
|---|---|---|
| DE | 102015014651 A1 | 5/2017 |
| DE | 102016216335 A1 | 3/2018 |
| DE | 102018212916 A1 | 2/2020 |
| DE | 112020004139 T5 | 5/2022 |
| DE | 102021204067 A1 | 10/2022 |
| DE | 102022003749 A1 | 12/2022 |
| DE | 102022101540 A1 | 7/2023 |

* cited by examiner

150

152

154

156

158

160

VEHICLE CONTROL BASED ON PATHWAY PAVING STATUS AND LOCATION TELEMETRY

INTRODUCTION

The present disclosure relates generally to profiling a respective pathway using aggregated vehicle trajectories of a plurality of vehicles traversing the respective pathway and controlling operation of a vehicle on the respective pathway. An autonomous vehicle may navigate through its environment using sensors to detect objects and guided by a vehicle planning algorithm for planning its trajectory. However, the complexities of vehicular movement on tertiary or under-developed roads may present challenges for the navigation of autonomous vehicles.

SUMMARY

Disclosed herein is a system for controlling the operation of a vehicle. The system includes a controller having a processor and tangible, non-transitory memory on which instructions are recorded. The vehicle is capable of an automated driving mode. A command unit is adapted to generate a respective paving status of a respective pathway based on aggregated vehicle trajectories of a plurality of vehicles traversing the respective pathway, including extracting respective coordinates and respective trajectories of the plurality of vehicles over a predefined time period. The command unit is adapted to determine respective lateral distances between the plurality of vehicles and a centerline in the respective pathway. The respective pathway is designated as an unpaved pathway when one or more predefined conditions based on the respective lateral distances are met. The unpaved pathway is defined by an absence of centerline markings.

The controller is adapted to retrieve the respective paving status and control operation of the vehicle based in part on the respective paving status when the vehicle is traversing the unpaved pathway. Controlling operation of the vehicle may include transmitting a takeover request to a user of the vehicle to switch from the automated driving mode to a manual driving mode when the vehicle is traversing the unpaved pathway.

The command unit may be adapted to transmit the respective paving status to a database, with the controller being adapted to retrieve the respective paving status from the database. The system may include a vehicle planning module executable by the controller to generate a trajectory plan constrained by a set of planning parameters for the vehicle. The controller may be adapted to generate at least one adjusted parameter in the set of planning parameters when the vehicle is traversing the unpaved pathway. The vehicle planning module is adapted to generate a modified trajectory plan based on the adjusted parameter. The controller is adapted to use the modified trajectory plan when the vehicle is on the unpaved pathway and discontinue using the modified trajectory plan when the unpaved pathway has fully been traversed.

The adjusted parameter may include a minimum lateral distance and/or a minimum longitudinal gap between the vehicle and a neighboring vehicle. The adjusted parameter may include a maximum speed limit, a maximum acceleration during a maneuver of the vehicle and a minimum acceleration during the maneuver. The controller may be adapted to divide the set of planning parameters into a primary list and a secondary list having respective weighting factors, the primary list being prioritized for adjustment over the secondary list.

The respective pathway is designated as an unpaved pathway when one or more predefined conditions based on the respective lateral distances are met. In one embodiment, the predefined conditions include: a predefined percentage of the plurality of vehicles crossing the centerline in the respective pathway at least once, and a mean value of the respective lateral distances being greater than a predetermined distance. In one example, the predefined percentage is 50% and the predetermined distance is 0.80 meters.

In another embodiment, the predefined conditions include: an absolute value of skewness factor of a distribution of the respective lateral distances being greater than a skewness threshold; the absolute value of a kurtosis factor of the distribution being greater than a kurtosis threshold; and a mean value of the respective lateral distances being greater than a predetermined distance. In one example, the skewness threshold is 3, the kurtosis threshold is 3, and the predetermined distance is between about 0.80 meters and 1.0 meters.

Disclosed herein is a method of controlling the operation of a vehicle with a controller having a processor and tangible, non-transitory memory on which instructions are recorded, and a command unit accessible to the controller. The method includes generating a trajectory plan based in part on a set of planning parameters via execution of a vehicle planning module by the controller, the vehicle being capable of an automated driving mode. The method includes generating a respective paving status of a respective pathway based on aggregated vehicle trajectories of a plurality of vehicles traversing the respective pathway, via the command unit, including: extracting respective coordinates and respective trajectories of the plurality of vehicles over a predefined time period and determining respective lateral distances between the plurality of vehicles and a centerline in the respective pathway.

The method includes designating the respective pathway as an unpaved pathway when one or more predefined conditions based on the respective lateral distances are met, via the command unit, the unpaved pathway being defined by an absence of centerline markings. The method includes retrieving the respective paving status when the vehicle is traversing the unpaved pathway, via the controller, and controlling operation of the vehicle based in part on the respective paving status.

Disclosed herein is a vehicle having a controller with a processor and tangible, non-transitory memory on which instructions are recorded, the vehicle being capable of an automated driving mode. A vehicle planning module is executable by the controller to generate a trajectory plan constrained by a set of planning parameters for the vehicle. The controller is adapted to retrieve a respective paving status when the vehicle is traversing a respective pathway. The respective paving status is generated by a command unit using aggregated vehicle trajectories of a plurality of vehicles traversing the respective pathway.

The command unit is adapted to designate the respective pathway as an unpaved pathway when one or more predefined conditions are met, the one or more predefined conditions being based on respective lateral distances between the plurality of vehicles and a centerline in the respective pathway, the unpaved pathway being defined by an absence of centerline markings. The controller is adapted to retrieve the respective paving status and control operation of the vehicle based in part on the respective paving status when the vehicle is traversing the unpaved pathway. Controlling operation of the vehicle includes transmitting a takeover request to a user of the vehicle to switch from the automated driving mode to a manual driving mode when the vehicle is traversing the unpaved pathway.

The above features and advantages and other features and advantages of the present disclosure are readily apparent from the following detailed description of the best modes for carrying out the disclosure when taken in connection with the accompanying drawings.

Figure 1:
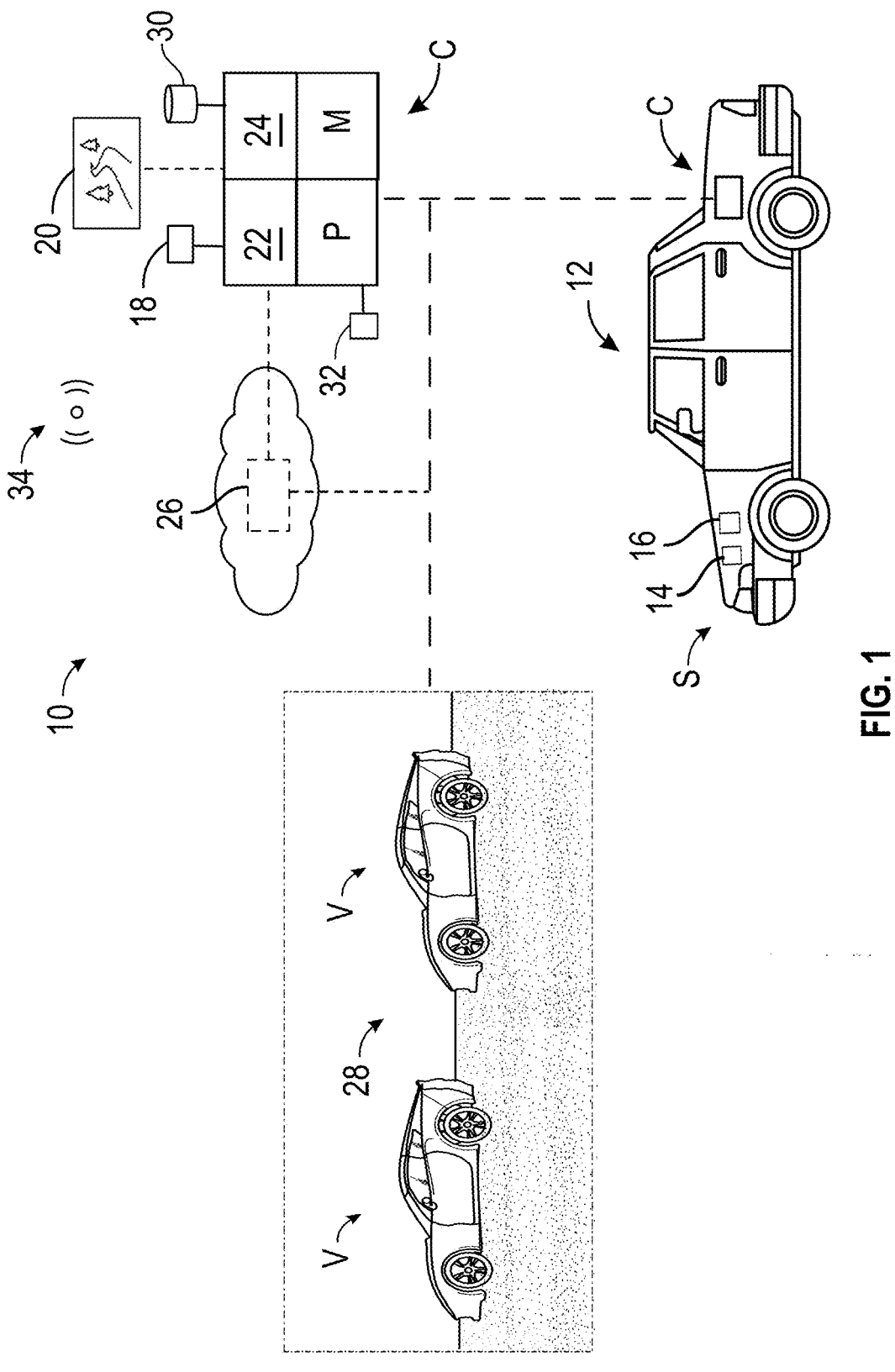
FIG. 1 is a schematic fragmentary diagram of a system for controlling operation of a vehicle having a controller.

Representative embodiments of this disclosure are shown by way of non-limiting example in the drawings and are described in additional detail below. It should be understood, however, that the novel aspects of this disclosure are not limited to the particular forms illustrated in the above-enumerated drawings. Rather, the disclosure is to cover modifications, equivalents, combinations, sub-combinations, permutations, groupings, and alternatives falling within the scope of this disclosure as encompassed, for instance, by the appended claims.

DETAILED DESCRIPTION

Referring to the drawings, wherein like reference numbers refer to like components, FIG. 1 schematically illustrates a system 10 for controlling operation of a vehicle 12. The vehicle 12 may include, but is not limited to, a passenger vehicle, sport utility vehicle, light truck, heavy duty vehicle, minivan, bus, transit vehicle, bicycle, moving robot, farm implement (e.g., tractor), sports-related equipment (e.g., golf cart), boat, plane, train or another moving platform. The vehicle 12 may be an electric vehicle. The vehicle 12 may be part of a fleet of autonomous vehicles. It is to be understood that the vehicle 12 may take many different forms and have additional components.

Referring to FIG. 1, the vehicle 12 includes one or more sensors S for perceiving the surrounding environment. The sensors S may include a radar/lidar unit 14, and a camera 16. The sensors S may include a navigation sensor (e.g., GPS) and an inertial measurement unit. It is understood that the sensors S may incorporate other types of technologies available to those skilled in the art. As the vehicle 12 is in operation, data from the sensors S is transmitted to a vehicle planning module 18, which generates a trajectory plan 20 for the vehicle 12.

Referring to FIG. 1, the vehicle 12 is capable of an automated driving mode 22 and/or a manual driving mode 24. Referring to FIG. 1, the vehicle 12 includes a controller C that executes the automated driving mode 22 for the vehicle 12 based on the trajectory plan 20. The trajectory plan 20 guides the motion of the vehicle 12 and determines the appropriate steps for navigating traffic signs, intersections, various road and traffic conditions.

Referring to FIG. 1, the controller C is in communication with a remotely located cloud computing service or command unit 26. Referring to FIG. 1, the command unit 26 is adapted to profile a road or pathway 28 (term used interchangeably with map segment). The command unit 26 is adapted to generate the paving status of a pathway 28 using aggregated vehicle trajectories of a plurality of vehicles V traversing the pathway 28 over a predefined time period. A pathway 28 is designated as an unpaved pathway when one or more predefined conditions are met. The unpaved pathway is defined by an absence of centerline markings, or painted markings indicating the center of a pathway or road. A paved pathway is defined by the presence of centerline markings. The paving status of many different pathways may be stored in a database 30.

The command unit 26 has an integrated processor and memory (or non-transitory, tangible computer readable storage medium) on which instructions are recorded for a method 100 for identifying the paving status of a pathway 28 based on connected vehicle location telemetry, described below with respect to FIG. 2. The command unit 26 may include one or more remote servers hosted on the Internet to store, manage, and process data. The command unit 26 may be at least partially managed by personnel at various locations.

The controller C is adapted to retrieve the paving status from the database 30 when the vehicle 12 is about to traverse on a road/pathway. Referring to FIG. 1, the controller C has at least one processor P and at least one memory M (or non-transitory, tangible computer readable storage medium) on which instructions are recorded for executing a method 150 for controlling operation of the vehicle 12, described below with respect to FIG. 3. The operation of the vehicle 12 is controlled based on the paving status of the pathway 28, obtained by the command unit 26. The memory M can store executable instruction sets, and the processor P can execute the instruction sets stored in the memory M.

As described in detail below, the command unit 26 is adapted to determine the lateral offset from the centerline of the pathway 28 for the purpose of inferring the paving status. For example, if aggregated lateral behavior indicates that the plurality of vehicles V are driving on or across the centerline, the map segment or pathway 28 is marked as "unpaved", otherwise the map segment is marked as "paved". The data may be validated on paved and unpaved roads using naturalistic telemetry data. Map segments with increased lateral offsets and lateral offset variations are labeled as unpaved under the assumption that without centerline markings, drivers are not able to maintain a consistent lateral distance from the centerline. The system 10 provides an efficient way to perform map update functions on underdeveloped or tertiary roads.

Referring to FIG. 1, the vehicle 12 includes a telematics module 32 for establishing two-way communications with the command unit 26, shown in FIG. 1. The telematics module 32 is adapted to collect telemetry data, such as location, speed, powertrain data, maintenance requirements and servicing, by interfacing with various internal subsystems of the vehicle 12. The telematics module 32 may enable vehicle-to-vehicle (V2V) and/or vehicle-to-everything (V2X) communication.

Figure 2:
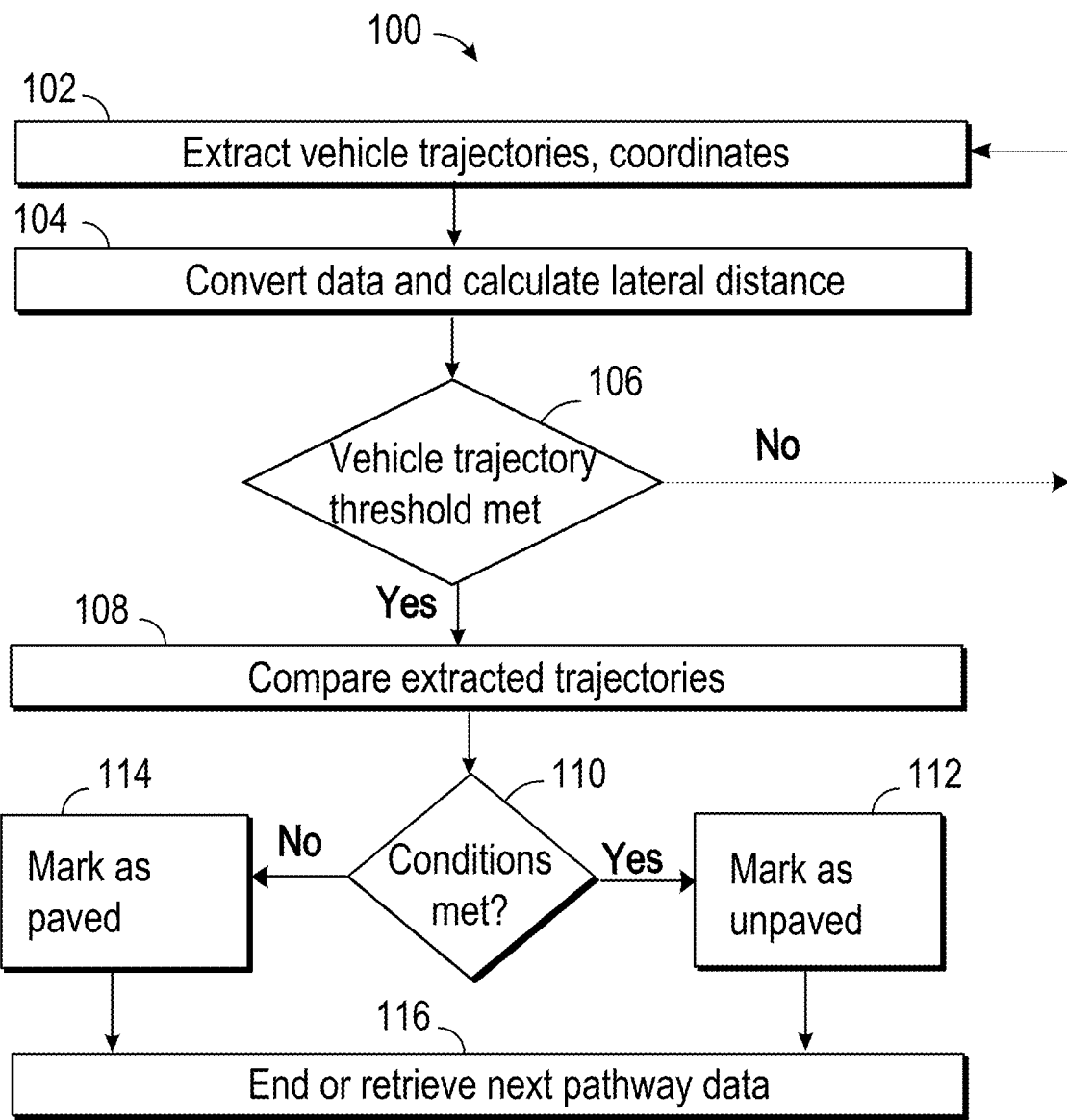
FIG. 2 is a flowchart for a method of identifying the paving status of a pathway based on connected vehicle location telemetry.

Referring now to FIG. 2, a flowchart of an example method 100 for identifying the paving status of a selected pathway 28 is shown. Method 100 may be embodied as computer-readable code or instructions stored on and at least partially executable by the command unit 26. Method 100 need not be applied in the specific order recited herein. Furthermore, it is to be understood that some blocks or steps may be eliminated.

Beginning at block 102, the command unit 26 is adapted to retrieve vehicle location telemetry from the database 30 to obtain detailed information about the pathway 28. The command unit 26 is adapted to extract respective coordinates and respective trajectories of a plurality of vehicles V traversing the pathway 28.

Advancing to block 104, the method 100 includes processing the trajectory data to determine a respective lateral distance between a centerline of the pathway 28 and the plurality of vehicles V. The centerline may be defined as the midline or centerline of the segment and may be designated or determined through satellite images. In one embodiment, the trajectory data is converted to a format where the respective coordinates are represented as a line, e.g., a line string format using Structured Query Language (SQL). SQL is a domain-specific language used to handle structured data, i.e., data incorporating relations among entities and variables.

Figure 4:
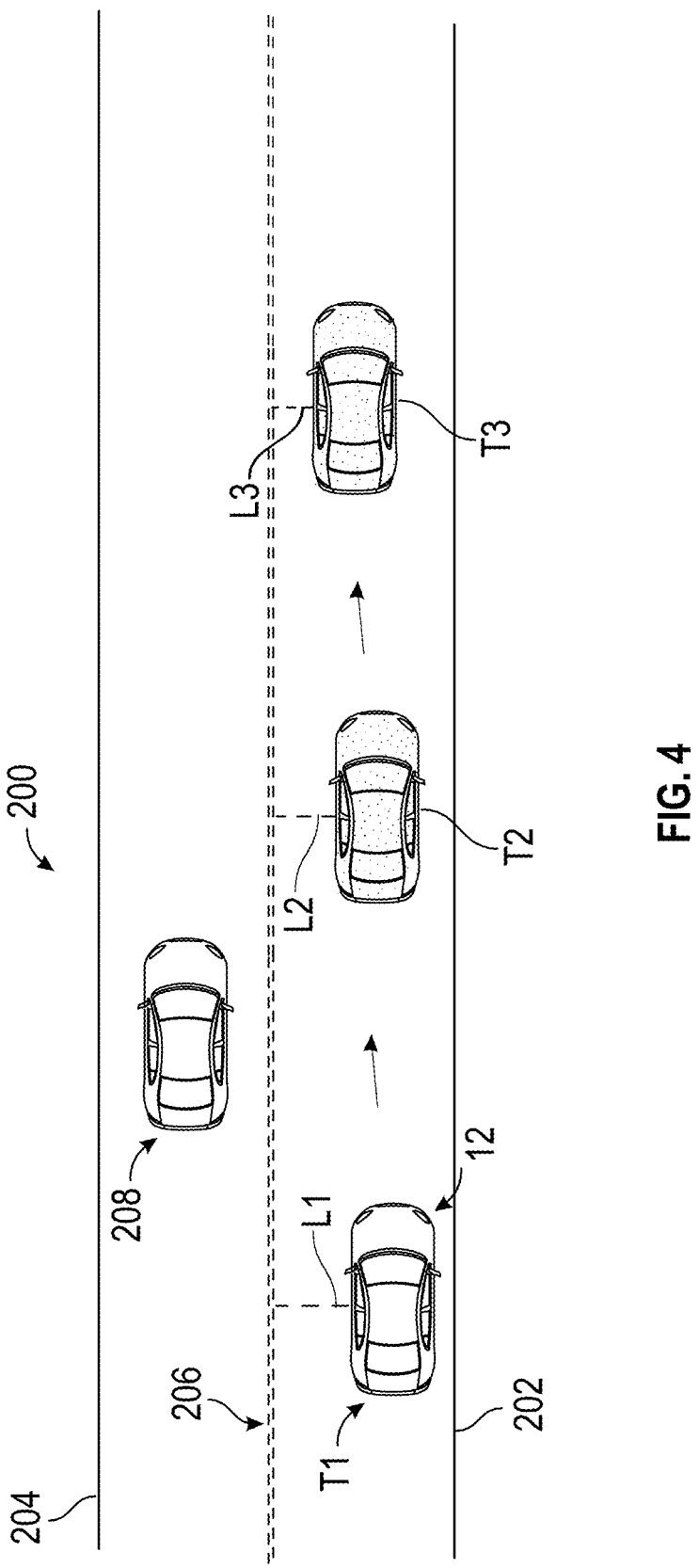
FIG. 4 is a schematic fragmentary diagram illustrating an example vehicle travelling on a pathway/segment.

Referring to FIG. 4, an example pathway 200 traversed by the vehicle 12 is shown. Referring to FIG. 4, the pathway 200 includes a first lane 202 adjacent to an opposing second lane 204 and separated by a centerline 206. The vehicle 12 is traversing through the first lane 202. At an initial time T1, the vehicle 12 is spaced at a first lateral distance L1 from the centerline 206, which may be an imaginary centerline (for unpaved pathways) or actual centerline markings (for paved pathway). At subsequent times T2 and T3, the vehicle 12 is spaced at respective lateral distances L2, L3 from the centerline 206.

The system 10 aggregates vehicle location telemetry (e.g., high speed vehicle telemetry that is reported every 3 seconds) and compares the computed trajectory to the centerline of the pathway obtained from the map database. Vehicle trajectories may align to the road shape when lane markers are present (i.e., in paved pathways) and have alignment discrepancies when lane markers are not present (i.e., unpaved pathways).

Proceeding to block 106, the command unit 26 is adapted to determine if a vehicle trajectory threshold has been met, i.e., a statistically sufficient number of vehicle trajectories are present for data analysis. If the threshold has not been met (block 106=NO), the method 100 loops back to block 102. If the threshold has been met (block 106=YES), the method 100 advances to block 108 to compare the extracted trajectories of the plurality of vehicles V.

Advancing to block 110, the method 100 includes performing an analysis to designate the status of the pathway 28. If one or more predefined conditions are met, (block 110=YES), the method 100 advances to block 112, where the pathway 28 is marked as "unpaved." If the conditions are not met, (block 110=NO), the method 100 advances to block 114, and the pathway 28 is marked as "paved."

In one embodiment, the predefined conditions include: (1) a predefined percentage or predefined majority (aggregate) of the vehicles V crossing the centerline (e.g., centerline 206 of the pathway 200) at least once; and (2) a mean value of the respective lateral distances of the plurality of vehicles V (from the centerline) being greater than a predetermined distance. In one example, the predefined percentage is about 50% and the predetermined distance is about 0.80 meters.

Figure 5:
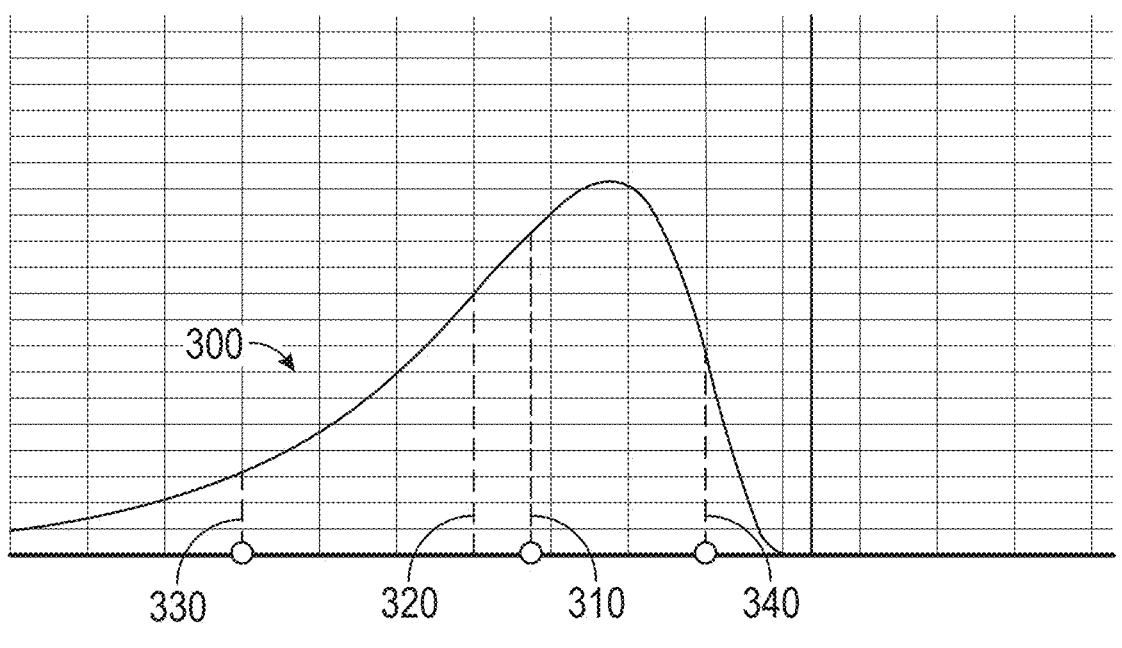
FIG. 5 is a schematic graph illustrating an example distribution of respective lateral distances of a plurality of vehicles on a pathway.

FIG. 5 is a schematic graph illustrating an example distribution 300 of respective lateral distances of the plurality of vehicles V on a map segment or pathway. Here, line 310 indicates the mean value of the distribution, line 320 indicates the pathway center, line 330 indicates the 25th percentile mark and line 340 indicates the 75th percentile mark. FIG. 5 illustrates a relatively skewed distribution. Skewness is a statistical measurement of how asymmetrical a distribution is, or how much it deviates from a symmetrical distribution. The greater the skewness factor of the distribution, the more likely that the pathway is unpaved.

Quantifying skewness or the asymmetry of a distribution in a dataset may be achieved with Pearson's first or second coefficients of skewness, or other formulas. Pearson's first coefficient of skewness calculates the difference between the mean and the mode of a dataset, divided by the standard deviation, while Pearson's second coefficient of skewness, calculates the difference between the mean and the median, multiplied by three and then divided by the standard deviation.

Figure 6:
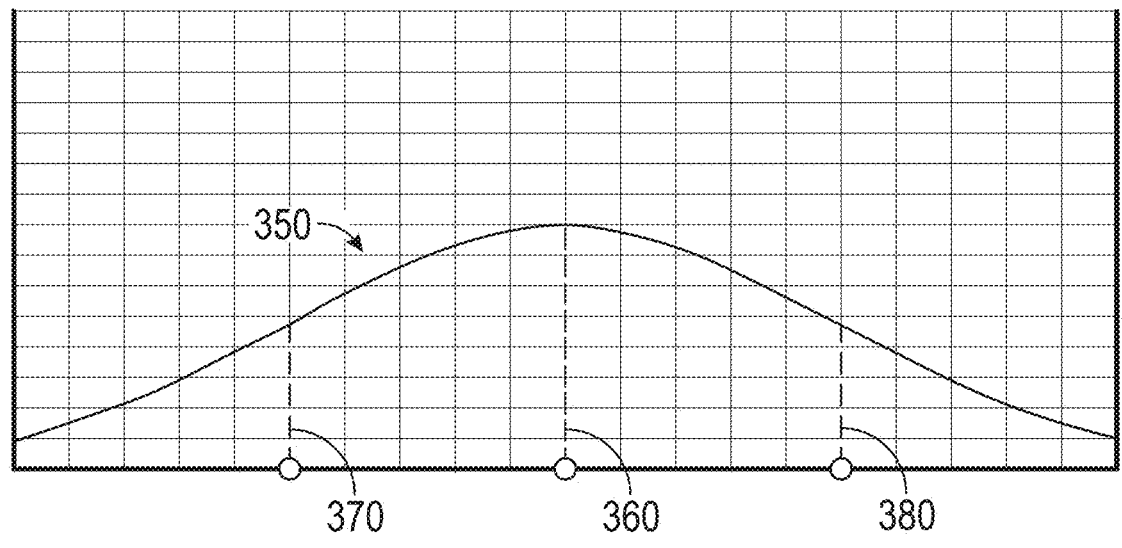
FIG. 6 is a schematic graph illustrating another example distribution of respective lateral distances of a plurality of vehicles on a pathway.

FIG. 6 is a schematic graph illustrating another example distribution 350 of respective lateral distances of the plurality of vehicles V on a pathway. FIG. 6 illustrates a distribution with excess kurtosis. Excess kurtosis indicates a greater presence of extreme regions on either side of the center of the distribution 350, relative to a normal Gaussian distribution. Here, line 360 indicates the pathway center, line 370 indicates the 25th percentile mark and line 380 indicates the 75th percentile mark. A standard distribution may have a kurtosis factor of 3. A distribution with an increased kurtosis factor (>3) may be visualized as a thin "bell" with a high peak, while a decreased kurtosis factor corresponds to a broadening of the peak and "thickening" of the tails.

In another embodiment, the predefined conditions include: (1) a mean value of the respective lateral distances of the plurality of vehicles V being greater than a predetermined distance; (2) the absolute value of the skewness of a distribution of respective lateral distances being greater than a threshold value, referred to as a skewness threshold; and (3) the absolute value of the kurtosis of the distribution being greater than a threshold value, referred to as a kurtosis threshold. In one example, the predetermined distance is between about 0.8 meters and 1.0 meters, the skewness threshold is 3 and the kurtosis threshold is 3.

The command unit 26 may be adapted to refine the analysis by establishing consistent lateral distances or defining standard deviation thresholds. This aids in identifying patterns and anomalies in vehicular movement. Additionally, the command unit 26 is adapted to identify overlapping lateral trajectories. For example, instances of centerline crossover are identified, signaling potential traffic flow overlap and travel proximity between vehicles.

Referring to FIG. 2, from blocks 112 and 114, the method 100 advances to block 116 where the output of the distribution analysis is transmitted to a database 30 which stores these parameters (and their corresponding trajectories) as a learning dataset for future use for the vehicle 12 and other connected vehicles. Next, the method 100 may be ended, or the identification number for the next selected map segment or pathway to be profiled is retrieved and the process repeated.

Figure 3:
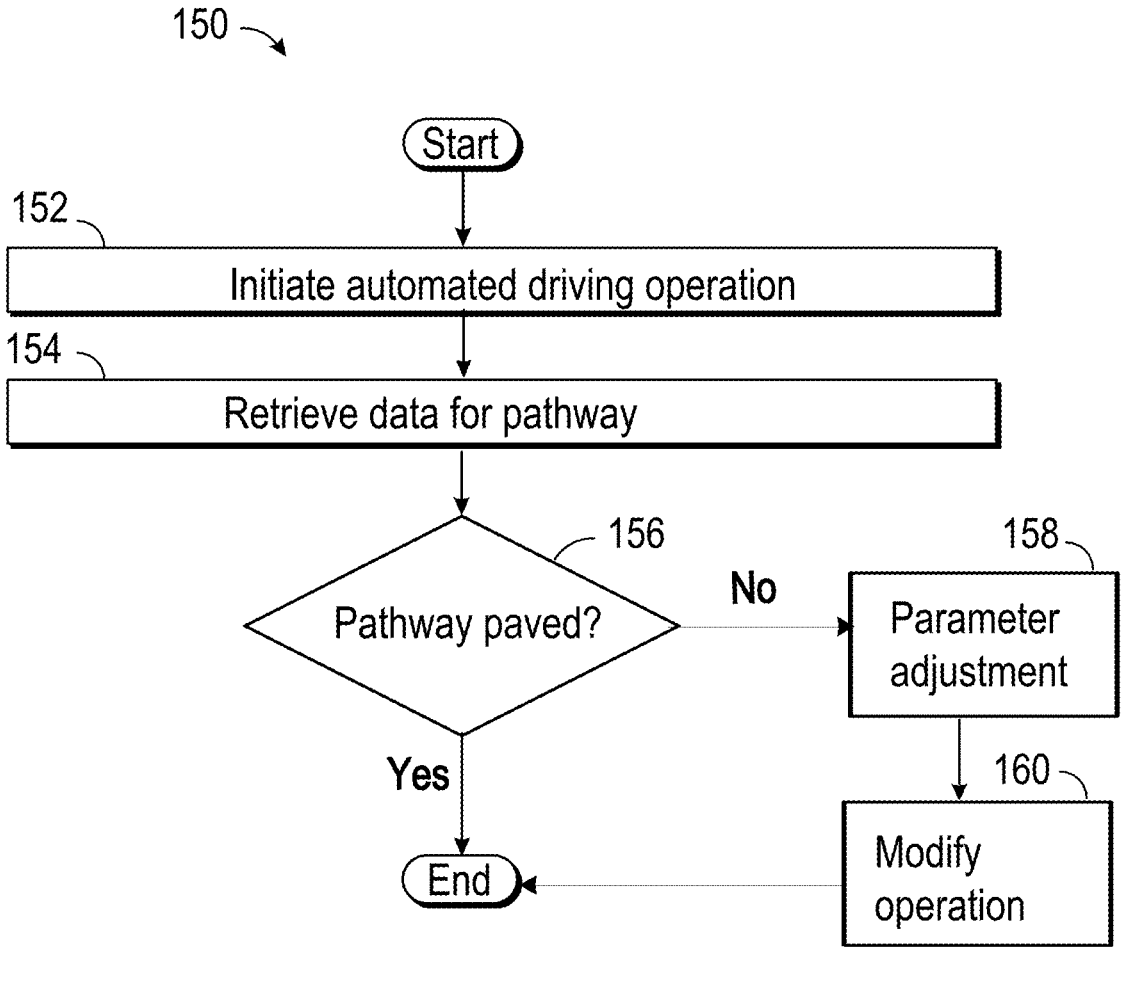
FIG. 3 is a flowchart for a method of controlling operation of the vehicle of FIG. 1.

Referring now to FIG. 3, a flowchart of an example method 150 of controlling operation of the vehicle 12 is shown. Method 150 may be embodied as computer-readable code or instructions stored on and at least partially executable by the controller C. Method 150 need not be applied in the specific order recited herein. Furthermore, it is to be understood that some blocks or steps may be eliminated. Method 150 may be executed in real-time, continuously, systematically, sporadically and/or at regular intervals, for example, each 10 milliseconds during normal and ongoing operation of the vehicle 12.

Beginning at block 152 of FIG. 3, the automated driving mode 22 is initiated for a vehicle 12 about to begin travers- ing on a pathway 28. Advancing to block 154, the controller C is adapted to obtain data pertaining to the pathway 28, including detailed information about traffic patterns (e.g., presence of roundabouts) for the respective pathway 28 and other contextual information (e.g., time-of-day, weather).

Proceeding to block 156, the controller C is adapted to retrieve the respective paving status of the pathway 28, e.g., from the database 30. If the pathway 28 is paved (block 156=YES), the method 100 ends. If the pathway 28 is not paved (block 156=NO), the method 150 advances to block 158 to determine if adjustments to the parameters employed by the vehicle planning module 18 are appropriate. As part of determining the trajectory plan 20, each level of the vehicle planning module 18 incorporates different sets of parameters or constraints which limit the set of feasible solutions available to the vehicle planning module 18. The parameters that may be adjusted include a minimum lateral distance and/or a minimum longitudinal gap between the vehicle and a neighboring vehicle 208 (see FIG. 4), accept- able headway distance between vehicles, allowable speed range, maximum acceleration during a vehicle maneuver (e.g., turning), minimum acceleration during a vehicle maneuver, minimum lateral distance between vehicles and minimum distance from occluded objects.

The controller C may be adapted to divide the set of planning parameters into a primary list of adjustment param- eters and a secondary list of adjustment parameters, with weighting factors to create priority in terms of adjustment of parameters. The primary list of adjustment parameters is adjusted first before the secondary set of adjustment param- eters. The primary list of adjustment parameters may have a lower cost on performance. For example, in a muddy unpaved pathway scenario, maintaining a minimum distance from other vehicles may be prioritized.

Proceeding to block 160, operation of the vehicle 12 is controlled based on the paving status of the pathway 28. Controlling operation of the vehicle 12 may include trans- mitting a takeover request to a user of the vehicle 12 to switch from the automated driving mode 22 to the manual driving mode 24 when the vehicle 12 is traversing the unpaved pathway.

Controlling operation of the vehicle 12 may include using the adjusted set of parameters (from block 158) to update the vehicle planning module 18 and generate a modified vehicle trajectory. The controller C is adapted to generate at least one adjusted parameter in the set of planning parameters when the vehicle 12 is traversing a respective pathway 28 that is designated as an unpaved pathway. The vehicle planning module 18 is adapted to generate a modified trajectory plan based on the at least one adjusted parameter. The automated driving mode 22 is carried out based on the modified vehicle trajectory. For example, the vehicle 12 may reduce speed on unpaved pathways, or alter the navigation route to avoid the unpaved pathway. The modification may be based on the vehicle type. For example, if the vehicle 12 is carrying a load or trailer, the reduction in speed on the unpaved pathway is greater.

In summary, system 10 employs a blend of onboard sensing and data analytics to identify and analyze vehicular movement on tertiary roads for determining pathway paving status (paved/unpaved). The command unit 26 is adapted to employ connected vehicle location data (e.g., aggregated vehicle trajectories) to profile map segments. The aggre- gated vehicle trajectories are compared to map segment road centerlines to infer pathway paving status. For example, an aggregate analysis of the mean distance of one set of vehicles may indicate that they travel almost equidistant from the centerline, in both directions of traffic. This con- sistent behavior will be reflected in individual vehicle tra- jectories of the set, indicating that the pathway 28 is paved. An aggregate analysis of the mean distance of a different set of vehicles may indicate that their lateral offset from the centerline is higher compared to paved roads in both direc- tions, with individual vehicle trajectories being dispersed across the pathway. This indicates that the pathway 28 is unpaved and missing centerline markers.

Referring to FIG. 1, a wireless network 34 may be utilized for communications between the controller C and command unit 26. The wireless network 34 may be a short-range network or a long-range network. The wireless network 34 may be a communication BUS, which may be in the form of a serial Controller Area Network (CAN-BUS). The wireless network 34 may be a serial communication bus in the form of a local area network. The local area network may include, but is not limited to, a Controller Area Network (CAN), a Controller Area Network with Flexible Data Rate (CAN- FD), Ethernet, Bluetooth, WIFI and other forms of data. The wireless network 34 may be a Wireless Local Area Network (LAN) which links multiple devices using a wireless distri- bution method, a Wireless Metropolitan Area Network (MAN) which connects several wireless LANs or a Wireless Wide Area Network (WAN) which covers large areas such as neighboring towns and cities. Other types of network technologies or communication protocols available to those skilled in the art may be employed.

The controller C of FIG. 1 includes a computer-readable medium (also referred to as a processor-readable medium), including a non-transitory (e.g., tangible) medium that par- ticipates in providing data (e.g., instructions) that may be read by a computer (e.g., by a processor of a computer). Such a medium may take many forms, including, but not limited to, non-volatile media and volatile media. Non- volatile media may include, for example, optical or magnetic disks and other persistent memory. Volatile media may include, for example, dynamic random-access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a flexible disk, hard disk, magnetic tape, other magnetic medium, a CD-ROM, DVD, other optical medium, a physical medium with patterns of holes, a RAM, a PROM, an EPROM, a FLASH-EEPROM, other memory chip or cartridge, or other medium from which a computer can read.

Look-up tables, databases, data repositories or other data stores described herein may include various kinds of mecha- nisms for storing, accessing, and retrieving various kinds of data, including a hierarchical database, a group of files in a file rechargeable energy storage system, an application data- base in a proprietary format, a relational database manage- ment system (RDBMS), etc. Each such data store may be included within a computing device employing a computer operating system such as one of those mentioned above and may be accessed via a network in one or more of a variety of manners. A file system may be accessible from a com- puter operating system and may include files stored in various formats. An RDBMS may employ the Structured Query Language (SQL) in addition to a language for creating, storing, editing, and executing stored procedures, such as the PL/SQL language mentioned above.

The flowcharts illustrate an architecture, functionality, and operation of possible implementations of systems, methods, and computer program products of various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by specific purpose hardware-based storage systems that perform the specified functions or acts, or combinations of specific purpose hardware and computer instructions. These computer program instructions may also be stored in a computer-readable medium that may direct a controller or other programmable data processing apparatus to function in a particular manner, such that the instructions stored in the computer-readable medium produce an article of manufacture including instructions to implement the function/act specified in the flowchart and/or block diagram blocks.

The numerical values of parameters (e.g., of quantities or conditions) in this specification, including the appended claims, are to be understood as being modified in each respective instance by the term "about" whether or not "about" actually appears before the numerical value. "About" indicates that the stated numerical value allows some slight imprecision (with some approach to exactness in the value; about or reasonably close to the value; nearly). If the imprecision provided by "about" is not otherwise understood in the art with this ordinary meaning, then "about" as used here indicates at least variations that may arise from ordinary methods of measuring and using such parameters. In addition, disclosure of ranges includes disclosure of each value and further divided ranges within the entire range. Each value within a range and the endpoints of a range are hereby disclosed as separate embodiments.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings, or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A system for controlling operation of a vehicle, comprising:

a controller having a processor and tangible, non-transitory memory on which instructions are recorded, the vehicle being capable of an automated driving mode;

a command unit adapted to generate a respective paving status of a respective pathway based on aggregated vehicle trajectories of a plurality of vehicles traversing the respective pathway, including:

extracting respective coordinates and respective trajectories of the plurality of vehicles over a predefined time period; and determining respective lateral distances between the plurality of vehicles and a centerline in the respective pathway;

wherein the command unit is adapted to designate the respective pathway as an unpaved pathway when one or more predefined conditions based on the respective lateral distances are met, the unpaved pathway being defined by an absence of centerline markings; and wherein the controller is adapted to retrieve the respective paving status and control operation of the vehicle based in part on the respective paving status when the vehicle is traversing the unpaved pathway.

2. The system of claim 1, wherein controlling operation of the vehicle includes transmitting a takeover request to a user of the vehicle to switch from the automated driving mode to a manual driving mode when the vehicle is traversing the unpaved pathway.

3. The system of claim 1, wherein the command unit is adapted to transmit the respective paving status to a database and the controller is adapted to retrieve the respective paving status from the database.

4. The system of claim 1, further comprising:

a vehicle planning module executable by the controller to generate a trajectory plan constrained by a set of planning parameters for the vehicle;

wherein the controller is adapted to generate at least one adjusted parameter in the set of planning parameters when the vehicle is traversing the unpaved pathway, the vehicle planning module being adapted to generate a modified trajectory plan based on the at least one adjusted parameter; and the controller is adapted to use the modified trajectory plan when the vehicle is on the unpaved pathway and discontinue using the modified trajectory plan when the unpaved pathway has fully been traversed.

5. The system of claim 4, wherein the at least one adjusted parameter includes a minimum lateral distance and/or a minimum longitudinal gap between the vehicle and a neighboring vehicle.

6. The system of claim 4, wherein:

the at least one adjusted parameter includes a maximum speed limit, a maximum acceleration during a maneuver of the vehicle and a minimum acceleration during the maneuver; and the controller is adapted to divide the set of planning parameters into a primary list and a secondary list having respective weighting factors, the primary list being prioritized for adjustment over the secondary list.

7. The system of claim 1, wherein the one or more predefined conditions include:

a predefined percentage of the plurality of vehicles crossing the centerline in the respective pathway at least once; and a mean value of the respective lateral distances being greater than a predetermined distance.

8. The system of claim 7, wherein the predefined percentage is 50% and the predetermined distance is 0.80 meters.

9. The system of claim 1, wherein the one or more predefined conditions include:

an absolute value of skewness factor of a distribution of the respective lateral distances being greater than a skewness threshold;

the absolute value of a kurtosis factor of the distribution being greater than a kurtosis threshold; and a mean value of the respective lateral distances being greater than a predetermined distance.

10. The system of claim 9, wherein the skewness threshold is 3, the kurtosis threshold is 3, and the predetermined distance is between about 0.80 meters and 1.0 meters.

11. A method of controlling operation of a vehicle with a controller having a processor and tangible, non-transitory memory on which instructions are recorded, and a command unit accessible to the controller, the method comprising:

generating a trajectory plan based in part on a set of planning parameters via execution of a vehicle planning module by the controller, the vehicle being capable of an automated driving mode;

generating a respective paving status of a respective pathway based on aggregated vehicle trajectories of a plurality of vehicles traversing the respective pathway, via the command unit, including:

extracting respective coordinates and respective trajectories of the plurality of vehicles over a predefined time period; and determining respective lateral distances between the plurality of vehicles and a centerline in the respective pathway;

designating the respective pathway as an unpaved pathway when one or more predefined conditions based on the respective lateral distances are met, via the command unit, the unpaved pathway being defined by an absence of centerline markings; and retrieving the respective paving status when the vehicle is traversing the unpaved pathway, via the controller, and controlling operation of the vehicle based in part on the respective paving status.

12. The method of claim 11, further comprising:

generating at least one adjusted parameter in the set of planning parameters when the vehicle is traversing the respective pathway designated as the unpaved pathway, via the controller, generating a modified trajectory plan based on the at least one adjusted parameter, via the vehicle planning module, the automated driving mode being based on the modified trajectory plan.

13. The method of claim 12, further comprising:

selecting the at least one adjusted parameter to include a minimum lateral distance and/or a minimum longitudinal gap between the vehicle and a neighboring vehicle.

14. The method of claim 12, further comprising:

selecting the at least one adjusted parameter to include a maximum speed limit, a maximum acceleration during a maneuver of the vehicle and a minimum acceleration during the maneuver.

15. The method of claim 11, wherein the one or more predefined conditions include:

a predefined percentage of the plurality of vehicles crossing the centerline in the respective pathway at least once; and a mean value of the respective lateral distances being greater than a predetermined distance.

16. The method of claim 15, further comprising:

selecting the predefined percentage to be 50% and the predetermined distance to be 0.80 meters.

17. The method of claim 11, wherein the one or more predefined conditions include:

an absolute value of skewness factor of a distribution of the respective lateral distances being greater than a skewness threshold;

the absolute value of a kurtosis factor of the distribution being greater than a kurtosis threshold; and a mean value of the respective lateral distances being greater than a predetermined distance.

18. The method of claim 17, further comprising:

selecting the skewness threshold to be 3, the kurtosis threshold to be 3, and the predetermined distance to be between about 0.80 meters and 1.0 meters.

19. A system for controlling operation of a vehicle, comprising:

a controller having a processor and tangible, non-transitory memory on which instructions are recorded, the vehicle being capable of an automated driving mode;

a vehicle planning module executable by the controller to generate a trajectory plan constrained by a set of planning parameters for the vehicle;

a command unit adapted to generate a respective paving status of a respective pathway based on aggregated vehicle trajectories of a plurality of vehicles traversing the respective pathway, wherein the controller is adapted to retrieve the respective paving status when the vehicle is traversing the respective pathway;

wherein the command unit is adapted to designate the respective pathway as an unpaved pathway when one or more predefined conditions are met, the one or more predefined conditions being based on respective lateral distances between the plurality of vehicles and a centerline in the respective pathway, the unpaved pathway being defined by an absence of centerline markings;

wherein the controller is adapted to retrieve the respective paving status and control operation of the vehicle based in part on the respective paving status when the vehicle is traversing the unpaved pathway; and wherein controlling operation of the vehicle includes transmitting a takeover request to a user of the vehicle to switch from the automated driving mode to a manual driving mode when the vehicle is traversing the unpaved pathway.

20. The system of claim 19, wherein the one or more predefined conditions include:

an absolute value of skewness factor of a distribution of respective lateral distances being greater than a skewness threshold;

the absolute value of a kurtosis factor of the distribution being greater than a kurtosis threshold; and a mean value of the respective lateral distances being greater than a predetermined distance.

* * * * *